US011031585B2

United States Patent
Ota

(10) Patent No.: US 11,031,585 B2
(45) Date of Patent: Jun. 8, 2021

(54) METHOD FOR PRODUCING COATED NICKEL-BASED LITHIUM-NICKEL COMPOSITE OXIDE PARTICLES

(71) Applicant: SUMITOMO METAL MINING CO., LTD., Tokyo (JP)

(72) Inventor: Yosuke Ota, Ome (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 85 days.

(21) Appl. No.: 16/073,496

(22) PCT Filed: Jan. 27, 2017

(86) PCT No.: PCT/JP2017/002908
§ 371 (c)(1),
(2) Date: Jul. 27, 2018

(87) PCT Pub. No.: WO2017/131147
PCT Pub. Date: Aug. 3, 2017

(65) Prior Publication Data
US 2019/0051889 A1    Feb. 14, 2019

(30) Foreign Application Priority Data
Jan. 28, 2016   (JP) .............................. JP2016-014551

(51) Int. Cl.
*H01M 4/1391*   (2010.01)
*H01M 4/525*    (2010.01)
(Continued)

(52) U.S. Cl.
CPC .......... *H01M 4/1391* (2013.01); *C01G 53/42* (2013.01); *C01G 53/50* (2013.01); *H01B 1/08* (2013.01);
(Continued)

(58) Field of Classification Search
CPC ..... C01G 53/42; C01G 53/50; C01P 2004/32; C01P 2004/61; H01M 2004/028;
(Continued)

(56) References Cited

U.S. PATENT DOCUMENTS 5,824,434 A * 10/1998 Kawakami .......... H01M 4/0435
                                                  429/209
9,627,680 B2   4/2017 Yukinobu
(Continued)

FOREIGN PATENT DOCUMENTS

CN   104823308 A   8/2015
JP   2002-237301 A   8/2002
(Continued)

OTHER PUBLICATIONS

International Search Report for International Application No. PCT/JP2017/002908 dated Mar. 7, 2017 (2 Sheets).
(Continued)

*Primary Examiner* — Mark Kopec
*Assistant Examiner* — Jaison P Thomas
(74) *Attorney, Agent, or Firm* — Kratz, Quintos & Hanson, LLP

(57) ABSTRACT

To provide: coated nickel-based lithium-nickel composite oxide particles which are able to be handled in the atmosphere and enable the achievement of a coating film of a lithium ion conductor having no adverse effects on battery characteristics; and a method for producing the coated nickel-based lithium-nickel composite oxide particles. A method for producing coated nickel-based lithium-nickel composite oxide particles, which comprises: an organic compound radicalization step wherein a radicalized organic compound is obtained by introducing an organic compound having 8 or less carbon atoms into a reaction gas, which has been excited into a plasma in the atmosphere, together with
(Continued)

a carrier gas and radicalizing the organic compound; and a coating step wherein the surface of each nickel-based lithium-nickel composite oxide particle is covered with a coating film that contains an organic compound of a polymer or copolymer by bringing the radicalized organic compound into contact with the surfaces of the nickel-based lithium-nickel composite oxide particles.

7 Claims, 4 Drawing Sheets

(51) Int. Cl.
| | |
|---|---|
| *H01M 4/36* | (2006.01) |
| *C01G 53/00* | (2006.01) |
| *H01B 1/08* | (2006.01) |
| *H01M 4/131* | (2010.01) |
| *H01M 4/134* | (2010.01) |
| *H01M 4/1395* | (2010.01) |
| *H01M 4/02* | (2006.01) |

(52) U.S. Cl.
CPC ........... *H01M 4/131* (2013.01); *H01M 4/134* (2013.01); *H01M 4/1395* (2013.01); *H01M 4/366* (2013.01); *H01M 4/525* (2013.01); *C01P 2004/32* (2013.01); *C01P 2004/61* (2013.01); *H01M 2004/028* (2013.01)

(58) Field of Classification Search
CPC .... H01M 4/131; H01M 4/134; H01M 4/1391; H01M 4/1395; H01M 4/366; H01M 4/525; Y02E 60/10; H01B 1/08
See application file for complete search history.

(56) References Cited

U.S. PATENT DOCUMENTS

| | | | |
|---|---|---|---|
| 2001/0045351 A1* | 11/2001 | Koh | B05D 1/62 204/164 |
| 2003/0175583 A1 | 9/2003 | Suzuki | |
| 2009/0194747 A1* | 8/2009 | Zou | H01M 4/623 252/519.33 |
| 2010/0055567 A1 | 3/2010 | Nakai | |
| 2010/0119947 A1* | 5/2010 | Lee | H01M 4/1391 429/231.95 |
| 2010/0167129 A1 | 7/2010 | Wu | |
| 2011/0045360 A1 | 2/2011 | Deguchi | |
| 2011/0062378 A1* | 3/2011 | Chang | H01M 4/505 252/182.1 |
| 2012/0153231 A1 | 6/2012 | Wang | |
| 2012/0261610 A1 | 10/2012 | Paulsen | |
| 2014/0017575 A1* | 1/2014 | Gothe | B05D 1/62 429/400 |
| 2014/0079995 A1 | 3/2014 | Wakada | |
| 2014/0087252 A1 | 3/2014 | Hirakawa | |
| 2015/0221983 A1 | 8/2015 | Kamiya | |
| 2017/0117550 A1* | 4/2017 | Ota | H01M 10/0525 |
| 2017/0200942 A1 | 7/2017 | Ota | |
| 2017/0207454 A1* | 7/2017 | Ota | H01M 4/624 |

FOREIGN PATENT DOCUMENTS

| | | | |
|---|---|---|---|
| JP | 2002-373643 A | 12/2002 | |
| JP | 2003-223896 A | 8/2003 | |
| JP | 2007-242356 A | 9/2007 | |
| JP | 2010-061864 A | 3/2010 | |
| JP | 2010-129494 A | 6/2010 | |
| JP | 2010-157512 A | 7/2010 | |
| JP | 2011-511402 A | 4/2011 | |
| JP | 2012-134125 A | 7/2012 | |
| JP | 2013-012410 A | 1/2013 | |
| JP | 2013-179063 A | 9/2013 | |
| JP | 2014-053097 A | 3/2014 | |
| WO | 02/091514 A1 | 11/2002 | |
| WO | 2010/090029 A1 | 8/2010 | |
| WO | WO2012/153469 A1 | 11/2012 | |
| WO | 2012/165422 A1 | 12/2012 | |
| WO | WO2015/182452 A1 | 12/2015 | |
| WO | WO-2015182453 A1 * | 12/2015 | ............ H01M 4/525 |
| WO | WO-2015190250 A1 * | 12/2015 | ............ H01M 10/30 |

OTHER PUBLICATIONS

Office Action of Chinese Patent Application No. 201780007484.4 dated Nov. 7, 2019 (5 sheets).

Written Opposition issued in JP Patent No. 6728716 (Application No. JP 2016-014551) dated Feb. 18, 2021 (40 sheets).

* cited by examiner

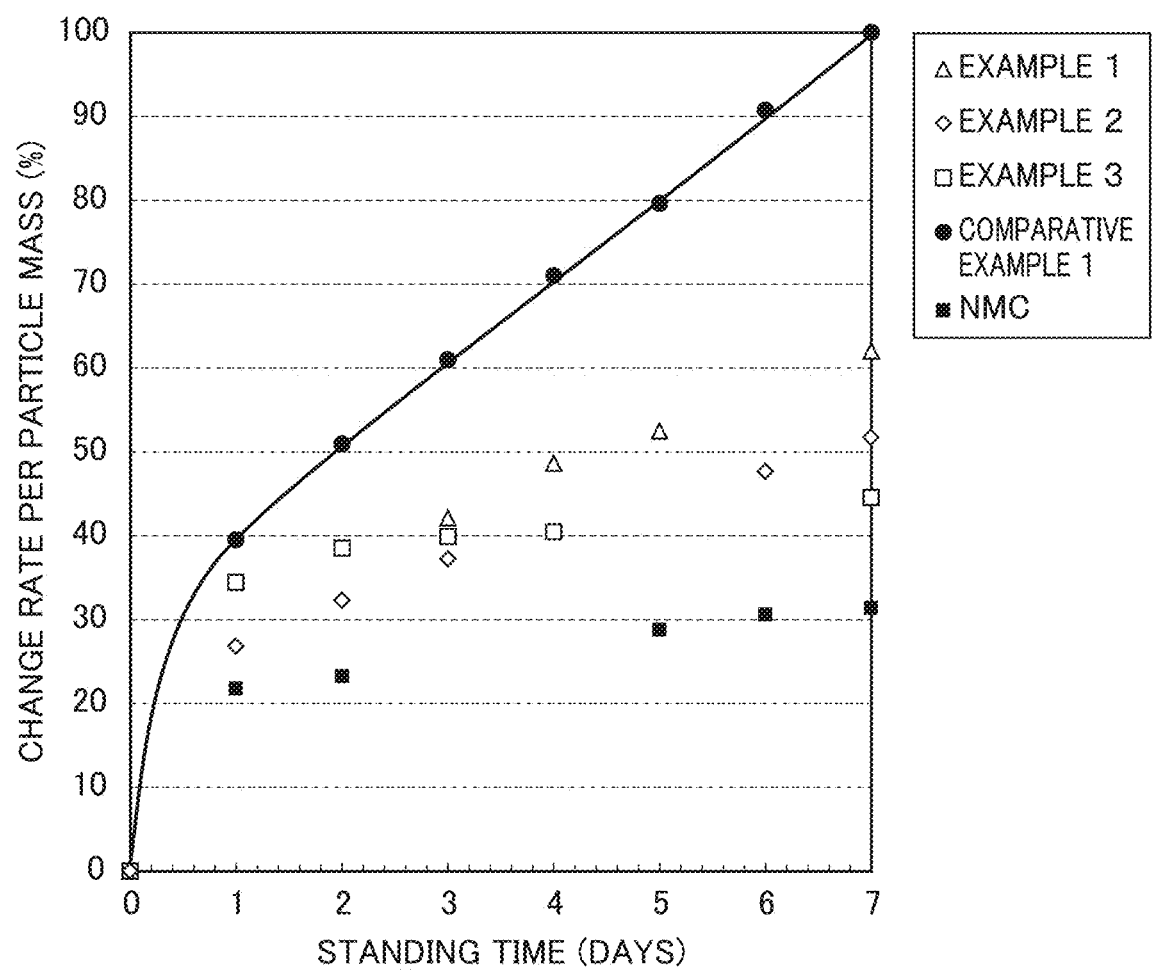

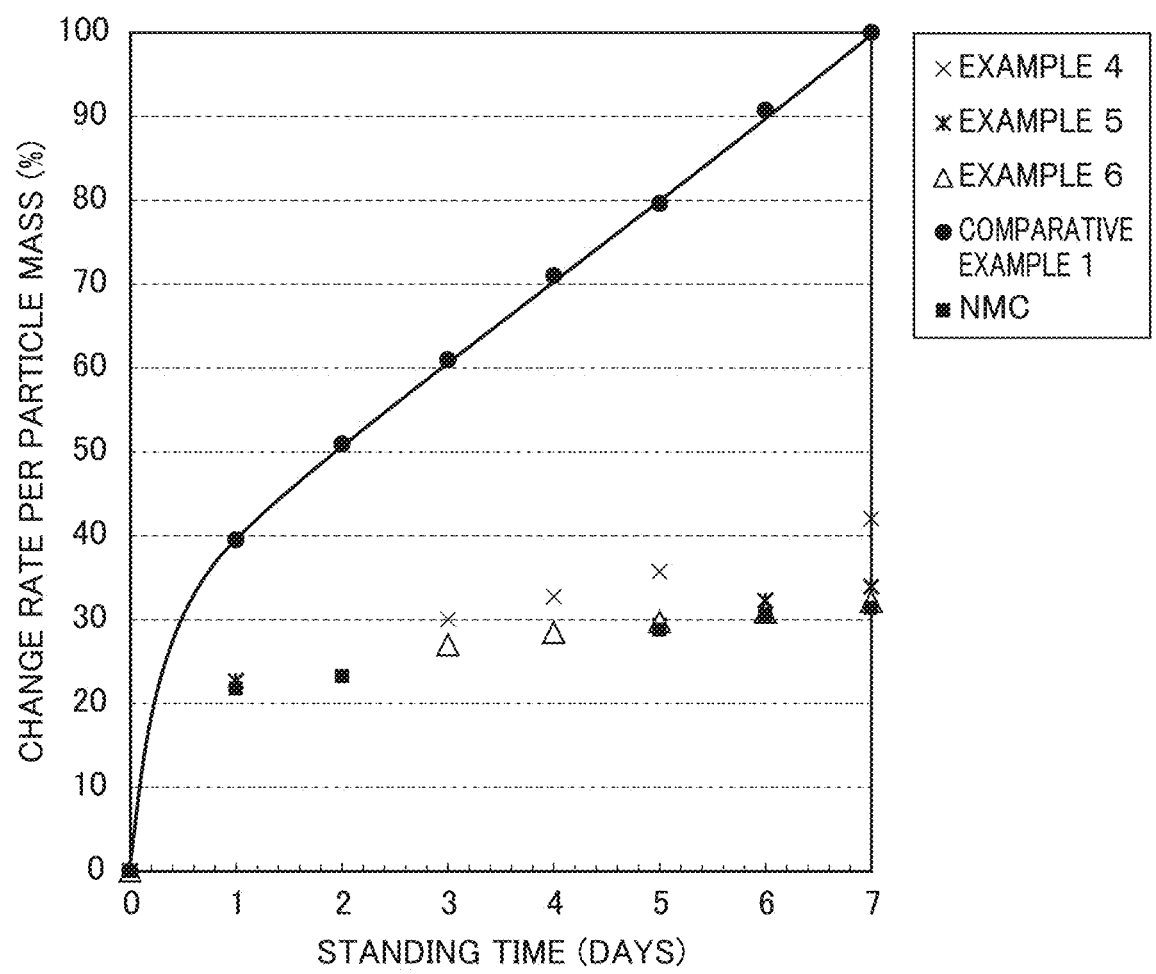

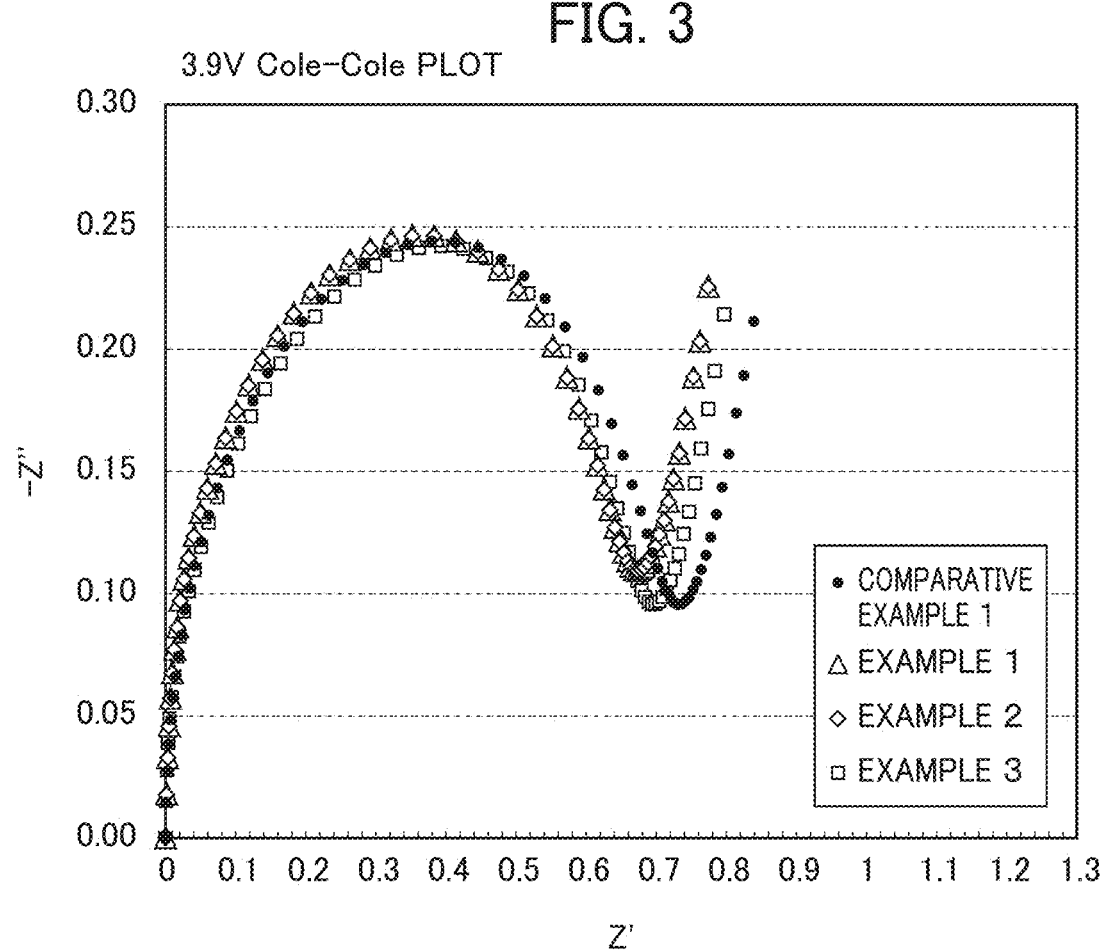

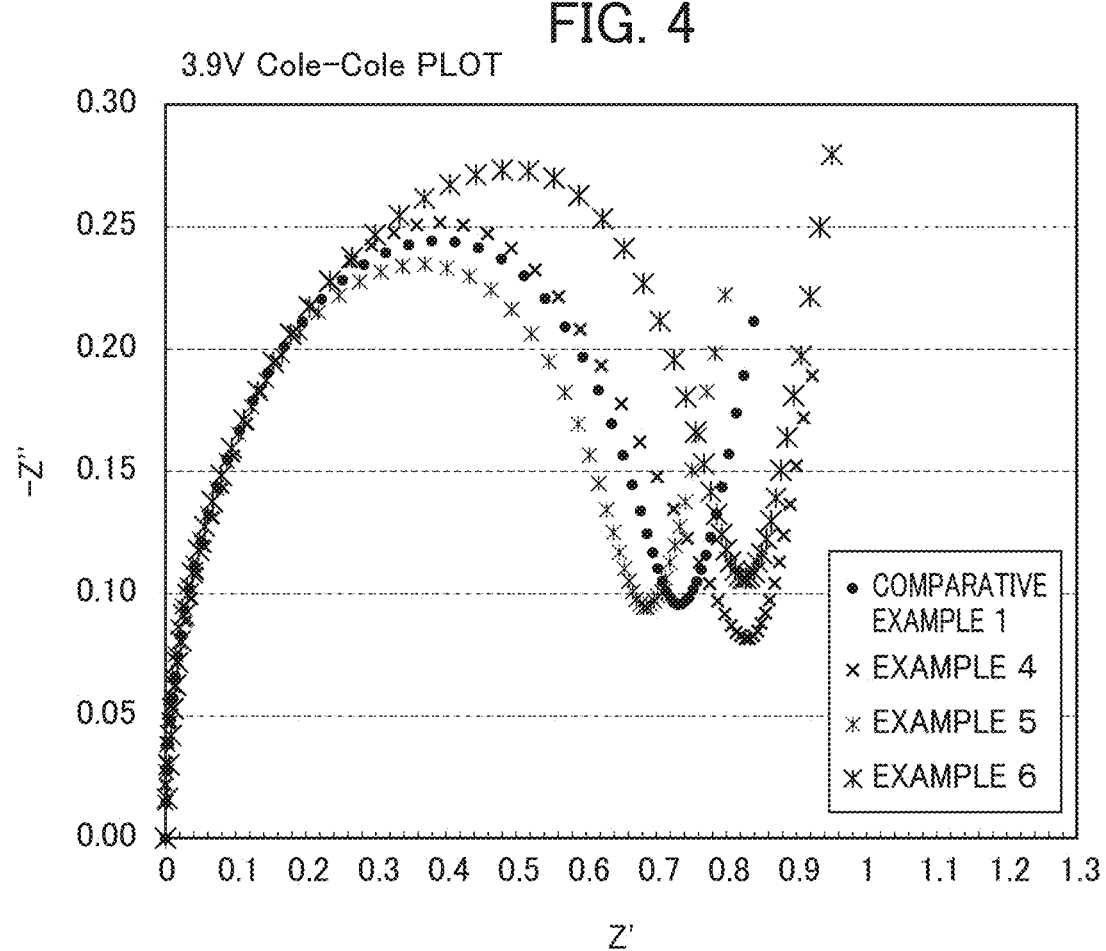

METHOD FOR PRODUCING COATED NICKEL-BASED LITHIUM-NICKEL COMPOSITE OXIDE PARTICLES

TECHNICAL FIELD

The present invention relates to a coated nickel-based lithium-nickel composite oxide particle with a high content of nickel, and also relates to a coated nickel-based lithium-nickel composite oxide particle of which the stability under the atmosphere is improved and which is easy to handle, and a method for producing the coated nickel-based lithium-nickel composite oxide particle.

BACKGROUND ART

In recent years, along with the rapid expansion of small-sized electronic devices such as cellular phones and laptop computers, a demand for a lithium-ion secondary battery as a chargeable and dischargeable power source has been rapidly increased. A lithium-cobalt oxide (hereinafter, sometimes also referred to as cobalt-based) has been widely used as a positive-electrode active substance contributing to the charging and discharging in a positive electrode of a lithium-ion secondary battery. However, capacity of the cobalt-based positive electrode has improved to the extent of theoretical capacity through the optimization of battery design, and higher capacity is becoming difficult to achieve.

Accordingly, a lithium-nickel composite oxide particle using a lithium-nickel oxide that has the theoretical capacity higher than that of the conventional cobalt-based one has been developed. However, the pure lithium-nickel oxide has a problem in terms of safety, cycle characteristics, and the like because of the high reactivity with water, carbon dioxide, or the like, and is difficult to be used as a practical battery. Therefore, a lithium-nickel composite oxide particle to which a transition metal element such as cobalt, manganese, and iron, or aluminum has been developed as an improvement measure for the problem described above.

In the lithium-nickel composite oxide, there are a composite oxide particle expressed by a transition metal composition of $Ni_{0.33}Co_{0.33}Mn_{0.33}$, a so-called ternary composite oxide (hereinafter, sometimes referred to as ternary), which is made by adding nickel, manganese, and cobalt in an equimolar amount, respectively, and a lithium-nickel composite oxide particle with a nickel content exceeding 0.65 mol, a so-called nickel-based composite oxide (hereinafter, sometimes referred to as nickel-based). From the viewpoint of capacity, a nickel-based with a large nickel content has a great advantage as compared to a ternary.

However, the nickel-based is characterized by being more sensitive depending on the environment as compared to a cobalt-based or a ternary, because of the high reactivity with water, carbon dioxide, and the like, and absorbing moisture and carbon dioxide ($CO_2$) in the air more easily. It has been reported that the moisture and carbon dioxide are deposited on a particle surface as impurities such as lithium hydroxide (LiOH), and lithium carbonate ($Li_2CO_3$), respectively, and have an adverse effect on the production process of a positive electrode or battery performance.

By the way, the production process of a positive electrode passes through a process in which a positive electrode mixture slurry obtained by mixing lithium-nickel composite oxide particles, a conductive auxiliary, a binder, an organic solvent, and the like is applied onto a collector made of aluminum or the like, and dried. In general, in the production process of a positive electrode mixture slurry, lithium hydroxide causes the slurry viscosity to increase rapidly by reacting with a binder, and may cause gelation of the slurry. These phenomena cause faults and defects, and a decrease of production yield of a positive electrode, and may cause a variation in quality of the products. Further, during charging and discharging, these impurities react with an electrolytic solution and sometimes generate gas, and may cause a problem in the stability of the battery.

Accordingly, in a case where a nickel-based is used as a positive-electrode active substance, in order to prevent the generation of impurities such as the above-described lithium hydroxide (LiOH), the production process of a positive electrode is required to be performed in a dry (low humidity) environment in a decarbonated atmosphere. Therefore, there is a problem that in spite of having high theoretical capacity and showing great promise as a material of a lithium-ion secondary battery, the nickel-based requires high cost for the introduction of a facility and high running costs for the facility in order to maintain the production environment, and which becomes a barrier to it becoming widespread.

In order to solve the problem described above, a method of coating a surface of a lithium-nickel composite oxide particle by using a coating agent has been proposed. Such a coating agent is roughly classified as an inorganic coating agent and an organic coating agent. As the inorganic coating agent, a material such as fumed silica, titanium oxide, aluminum oxide, aluminum phosphate, cobalt phosphate, and lithium fluoride have been proposed, and as the organic coating agent, a material such as carboxymethyl cellulose, and a fluorine-containing polymer have been proposed.

For example, in Patent Document 1, a method of forming a lithium fluoride (LiF) or fluorine-containing polymer layer on a surface of a lithium-nickel composite oxide particle has been proposed, and in Patent Document 2, a method of forming a fluorine-containing polymer layer onto a lithium-nickel composite oxide particle, and further adding a Lewis acid compound to neutralize impurities has been proposed. In any processing, the lithium-nickel composite oxide particle is modified so as to have the hydrophobic property with a coated layer containing a fluorine-based material, and the adsorption of moisture is suppressed, and the deposition of impurities such as lithium hydroxide (LiOH) can be suppressed.

However, the coated layer containing the above-described fluorine-based material, which is used in these coating methods, is merely attached onto a lithium-nickel composite oxide particle only by electrostatic attraction. Accordingly, the coated layer is redissolved in N-methyl-2-pyrrolidone (NMP), which is used as a solvent in the slurry production process, therefore, the coated layer is easily detached from the lithium-nickel composite oxide particle. As a result, the positive electrode is required to be stored in a dry (low humidity) environment in a decarbonated atmosphere, and not only cannot the faults and defects and the decrease of production yield, which are problems in the nickel-based, be suppressed, but also the problem with the stability of a battery substantially due to the generation of impurities cannot be thoroughly solved.

Patent Document 1: Japanese Unexamined Patent Application, Publication No. 2013-179063

Patent Document 2: Japanese Unexamined Patent Application (Translation of PCT Application), Publication No. 2011-511402

DISCLOSURE OF THE INVENTION

Problems to be Solved by the Invention

In view of the above-described problems of the conventional techniques, an object of the present invention is to provide a coated nickel-based lithium-nickel composite oxide particle that can be handled under the atmosphere and can obtain a coat film of a lithium ion conductor, the film not having an adverse effect on the battery characteristics, and a method for producing the coated nickel-based lithium-nickel composite oxide particle.

Means for Solving the Problems

As a result of intensive studies to solve the above-described problems of the conventional techniques, the present invention has found that by using a coated nickel-based lithium-nickel composite oxide particle, the stability in air is improved and further an adverse effect on the battery characteristics as a positive-electrode active substance is not exerted as long as the coated nickel-based lithium-nickel composite oxide particle is produced by a production method including a step of obtaining a radicalized organic compound by radicalizing an organic compound having 8 or less carbon atoms and a step of coating a nickel-based lithium-nickel composite oxide particle with an organic compound of a polymer or copolymer, and thus have completed the present invention.

A first aspect of the invention is a method for producing a coated nickel-based lithium-nickel composite oxide particle, including: an organic compound radicalization step of obtaining a radicalized organic compound by introducing an organic compound having 8 or less carbon atoms in a reaction, which has been excited into a plasma under the atmosphere, together with a carrier gas and radicalizing the organic compound; and a coating step of coating a surface of a nickel-based lithium-nickel composite oxide particle with a coat film that contains an organic compound of a polymer or copolymer by bringing the radicalized organic compound into contact with the surface of the nickel-based lithium-nickel composite oxide particle.

A second aspect of the invention is the method for producing a coated nickel-based lithium-nickel composite oxide particle according to the first aspect of the invention, in which the organic compound having 8 or less carbon atoms is an organic compound including at least one or more kinds selected from the group consisting of an aliphatic compound having 4 or less carbon atoms and an alicyclic compound having 4 or less carbon atoms.

A third aspect of the invention is the method for producing a coated nickel-based lithium-nickel composite oxide particle according to the first aspect of the invention, in which the organic compound having 8 or less carbon atoms is an organic compound including at least one or more kinds selected from the group consisting of an aliphatic compound having 5 or more to 8 or less carbon atoms, an alicyclic compound having 5 or more to 8 or less carbon atoms, and an aromatic compound having 5 or more to 8 or less carbon atoms.

A fourth aspect of the invention is the method for producing a coated nickel-based lithium-nickel composite oxide particle according to any one of the first to third aspects of the invention, in which the reaction gas includes at least one or more gases selected from the group consisting of argon, helium, nitrogen, and oxygen.

A fifth aspect of the invention is the method for producing a coated nickel-based lithium-nickel composite oxide particle according to any one of the first to fourth aspects of the invention, in which the carrier gas includes at least one or more gases selected from the group consisting of argon, helium, and nitrogen.

A sixth aspect of the invention is the method for producing a coated nickel-based lithium-nickel composite oxide particle according to any one of the first to fifth aspects of the invention, in which the nickel-based lithium-nickel composite oxide particle is represented by the following Formula (1), $$Li_xNi_{(1-y-z)}M_yN_zO_2 \quad (1)$$

(in the formula, x is a value of from 0.80 to 1.10, y is a value of from 0.01 to 0.20, z is a value of from 0.01 to 0.15, and 1-y-z is a value exceeding 0.65, and M represents at least one element selected from Co or Mn, and N represents at least one element selected from Al, In or Sn.)

A seventh aspect of the invention is a coated nickel-based lithium-nickel composite oxide particle for a lithium-ion battery positive-electrode active substance, in which a surface of a nickel-based lithium-nickel composite oxide particle is coated with an aliphatic compound of a polymer or copolymer, or an alicyclic compound of a polymer or copolymer.

Effects of the Invention

The coated nickel-based lithium-nickel composite oxide particle produced by the method for producing a coated nickel-based lithium-nickel composite oxide particle according to the present invention is a coated nickel-based lithium-nickel composite oxide particle that is coated with a coat film capable of suppressing the permeation of moisture and carbon dioxide, and has excellent stability in air. Further, the coat film of the coated nickel-based lithium-nickel composite oxide particle relating to the present invention is firmly bonded at the molecular level. Therefore, the coated nickel-based lithium-nickel composite oxide particle relating to the present invention is further excellent in terms of stability in air. Accordingly, production equipment that has been used for a cobalt-based and a ternary can also be used in place of positive-electrode production equipment in which carbon dioxide concentration and moisture concentration are strictly controlled.

In addition, the coat film of this coated nickel-based lithium-nickel composite oxide particle has favorable lithium ion conductivity. Therefore, the coat film does not adversely affect the battery characteristics as the positive-electrode active substance. The coated nickel-based lithium-nickel composite oxide particle can be provided as a high capacity composite oxide positive-electrode active substance for a lithium-ion battery that can ever be provided.

BRIEF DESCRIPTION OF THE DRAWINGS

FIG. 1 shows a change rate (%) per particle mass in a case after standing for one week in Examples 1 to 3 and Comparative Example 1.

FIG. 2 shows a change rate (%) per particle mass in a case after standing for one week in Examples 4 to 6 and Comparative Example 1.

FIG. 3 shows a Cole-Cole plot from an impedance test before the cycle test in Examples 1 to 3 and Comparative Example 1.

FIG. 4 shows a Cole-Cole plot from an impedance test before the cycle test in Examples 4 to 6 and Comparative Example 1.

PREFERRED MODE FOR CARRYING OUT THE INVENTION

Hereinafter, the coated nickel-based lithium-nickel composite oxide particle according to the present invention and the method for producing the same according to the present invention, and a coat film to be coated on the nickel-based lithium-nickel composite oxide particle will be described in detail. However, the present invention should not be construed as being limited to the following detailed explanation. In the present invention, there may be a case where a secondary particle aggregated with primary particles is referred to as a nickel-based lithium-nickel composite oxide particle.

<Coat Film>

The coat film relating to an embodiment of the present invention is a coat film formed on a surface of a lithium-nickel composite oxide particle by an atmospheric pressure plasma polymerization process under predetermined conditions by using an organic compound having 8 or less carbon atoms as a coating material. The coat film relating to the embodiment of the present invention has favorable lithium ion conductivity. Therefore, the coat film to be coated on a lithium-nickel composite oxide particle does not adversely affect the battery characteristics of a positive-electrode active substance. Further, the coat film relating to the embodiment of the present invention is coated by forming a copolymer by an atmospheric pressure plasma polymerization process under predetermined conditions as described later, therefore, it is extremely strong and highly safe in spite of being a thin film. In addition, when a coat film made of the polymer or copolymer serves as a coated layer of a nickel-based lithium-nickel composite oxide particle, the coated nickel-based lithium-nickel composite oxide particle has excellent stability in air. Accordingly, production equipment that has been used for a cobalt-based and a ternary can also be used. Therefore, the method for producing a coated nickel-based lithium-nickel composite oxide particle according to the embodiment of the present invention is a production method that can produce a coated nickel-based lithium-nickel composite oxide particle having excellent stability in air. Hereinafter, a method for producing a coated nickel-based lithium-nickel composite oxide particle according to an embodiment of the present invention, will be described in detail.

[Nickel-Based Lithium-Nickel Composite Oxide Particle]

The nickel-based lithium-nickel composite oxide particle is a spherical particle, and has an average particle diameter preferably of from 5 μm or more to 20 μm or less. When the average particle diameter is set in this range, favorable battery performance is provided as the nickel-based lithium-nickel composite oxide particle, and favorable battery repetition life (cycle characteristics) is also provided, as both can be achieved, therefore, this is preferred.

In addition, the nickel-based lithium-nickel composite oxide particle is preferably represented by the following Formula (1).

$$Li_xNi_{(1-y-z)}M_yN_zO_2 \quad (1)$$

In the formula, x is a value of from 0.80 to 1.10, y is a value of from 0.01 to 0.20, z is a value of from 0.01 to 0.15, and 1-y-z is a value exceeding 0.65, and M represents at least one element selected from Co or Mn, and N represents at least one element selected from Al, In or Sn.

Further, the value of 1-y-z (nickel content) is, from the viewpoint of the capacity, preferably a value exceeding 0.70, and more preferably a value exceeding 0.80.

The cobalt-based (LCO), the ternary (NCM), and the nickel-based (NCA) have an electrode energy density (Wh/L) of 2160 Wh/L ($LiCoO_2$), 2018.6 Wh/L ($LiNi_{0.33}Co_{0.33}Mn_{0.33}Co_{0.33}O_2$), and 2376 Wh/L ($LiNi_{0.8}Co_{0.15}Al_{0.05}O_2$), respectively. Accordingly, by using the nickel-based lithium-nickel composite oxide particle as a positive-electrode active substance of a lithium-ion battery, a battery having high capacity can be prepared.

<Method for Producing Coated Nickel-Based Lithium-Nickel Composite Oxide Particle>

The method for producing a coated nickel-based lithium-nickel composite oxide particle according to the embodiment of the present invention is a production method including: an organic compound radicalization step of obtaining a radicalized organic compound; and a coating step of coating a surface of a nickel-based lithium-nickel composite oxide particle with a coat film containing an organic compound of a polymer or copolymer. Specifically, an organic compound having 8 or less carbon atoms is radicalized by an atmospheric pressure plasma polymerization process, and then the radicalized organic compounds are reacted with each other on a surface of the nickel-based lithium-nickel composite oxide particle. Hereinafter, the organic compound radicalization step and the coating step will be described, respectively.

[Organic Compound Radicalization Step]

The organic compound radicalization step is a step of obtaining a radicalized organic compound by introducing an organic compound having 8 or less carbon atoms into a reaction gas, which has been excited into a plasma under the atmosphere, together with a carrier gas, and radicalizing the organic compound.

Examples of the atmospheric pressure plasma include corona discharge, dielectric barrier discharge, radiofrequency discharge, microwave discharge, and arc discharge, and in the present invention, any of them can be applied without particular limitation. For this reason, as a device used for plasmatization, any known plasma generator can be used without particular limitation as long as the plasma generator can convert the reaction gas into a plasma under the atmosphere. Note that in the present specification, the expression "atmosphere" includes atmospheric pressure (1013.25 hPa) and an atmospheric pressure in the vicinity of the atmospheric pressure, and also includes an atmospheric pressure within the range of the normal changes in the atmospheric pressure.

Further, in the organic compound radicalization step, an organic compound having 8 or less carbon atoms is introduced via a carrier gas into a reaction gas that has been excited into a plasma in advance. By adopting such a constitution, a dense coat film can be formed evenly all over the surface of the nickel-based lithium-nickel composite oxide particle while maintaining the basic skeleton (carbon skeleton) of the organic compound.

(Plasmatization Conditions)

As the conditions for plasmatizing reaction gas, from the viewpoint of forming a dense coat film by efficiently radicalizing an organic compound having 8 or less carbon atoms, the generator output voltage is preferably 150 V or more to 350 V or less, and more preferably is 200 V or more to 330 V or less. When the generator output voltage is less than 150 V, the reaction gas cannot be sufficiently excited into a plasma, and thus there may be a case where the organic compound having 8 or less carbon atoms cannot be efficiently radicalized. Further, when the generator output voltage exceeds 350 V, there may be a case where a problem such as breakage of the plasma generator is generated.

(Reaction Gas)

The reaction gas relating to the embodiment of the present invention is not particularly limited as long as it is easily converted into a plasma, and as the reaction gas, for example, argon, helium, neon, krypton, xenon, nitrogen, oxygen, air, or the like may be used. These reaction gases may be used alone, or may be used as a mixture of two or more kinds thereof at a predetermined ratio. Among them, in view of easy availability, it is preferred to use a reaction gas including at least one or more kinds selected from the group consisting of argon, helium, nitrogen, and oxygen. In particular, inexpensive nitrogen, oxygen, or air is more preferably used, and air is even more preferably used.

(Carrier Gas)

The carrier gas relating to the embodiment of the present invention is not particularly limited as long as it can smoothly transport the organic compound, and as the carrier gas, for example, argon, helium, neon, krypton, xenon, nitrogen, oxygen, or the like may be used. These reaction gases may be used alone, or may be used as a mixture of two or more kinds thereof at a predetermined ratio. Among them, in view of the easy availability, at least one kind selected from the group of argon, helium, nitrogen, and oxygen is preferably used, and nitrogen is more preferably used.

[Organic Compound]

The organic compound having 8 or less carbon atoms, which can form a coat film relating to the embodiment of the present invention is preferably a gaseous hydrocarbon-based compound that can mix uniformly with a carrier gas or a liquid hydrocarbon-based compound having volatility. As the most suitable organic compound having 8 or less carbon atoms, which can form a coat film relating to the embodiment of the present invention, a hydrocarbon-based gas having 4 or less carbon atoms or a hydrocarbon-based solvent having 5 or more to 8 or less carbon atoms can be suitably used. In addition, the hydrocarbon-based gas includes a hydrocarbon compound that is gaseous in a normal state and has 4 or less carbon atoms, and a compound obtained by substituting a part of the hydrogen atoms of the hydrocarbon compound with other atoms or functional groups. Further, the hydrocarbon-based solvent includes a hydrocarbon compound that is liquid in normal state and has 5 or more to 8 or less carbon atoms, and a compound obtained by substituting a part of the hydrogen atoms of the hydrocarbon compound with other atoms or functional groups. These organic compounds are gases in normal state or liquids having adequate volatility, therefore, uniform mixing with a carrier gas is easily performed. Accordingly, even in industrial-scale production, a dense coat film can be easily and evenly formed on a surface of the nickel-based lithium-nickel composite oxide particle.

In addition, in the method for producing a coated nickel-based lithium-nickel composite oxide particle according to the embodiment of the present invention, it is premised that either the above-described hydrocarbon-based gas or the hydrocarbon-based solvent is used as the organic compound, however, the hydrocarbon-based gas and the hydrocarbon-based solvent may be mixed and also used as long as handling and safety can be ensured. Further, when the organic compound (hydrocarbon-based gas, and hydrocarbon-based solvent) is introduced, it does not necessarily have to introduce the organic compound alone, and the organic compound may be introduced in a state of being mixed with an additive such as a stabilizer, and an antioxidant as long as it is used as the main component.

In addition, it is preferred that in consideration of the type of the organic compound to be used, the shape and size of the nickel-based lithium-nickel composite oxide particle to be coated, the plasmatization conditions, or the like, the introduction amount of the organic compound is appropriately adjusted so that the thickness of a coat film is in the above-described range.

(Hydrocarbon-Based Gas)

The hydrocarbon-based gas is a gas in a normal state, can be uniformly mixed with a carrier gas or a reaction gas, and further can maintain the mixed state for a relatively long period of time. Accordingly, by using a hydrocarbon-based gas as the organic compound capable of forming a coat film relating to the embodiment of the present invention, it becomes easy to radicalize (activate) the organic compound uniformly in the organic compound radicalization step, therefore, an extremely dense coat film can be formed evenly all over the surface of the nickel-based lithium-nickel composite oxide particle.

As such a hydrocarbon-based gas, it is preferred to use an aliphatic compound and/or an alicyclic compound, which have 4 or less carbon atoms.

For example, as the aliphatic compound having 4 or less carbon atoms, alkane, alkene, alkyne, or the like can be used. Specifically, at least one kind selected from methane, ethane, ethylene, acetylene, propane, propylene, n-butane, isobutane, n-pentane, isopentane, neopentane, methyl acetylene, ethyl acetylene, 1-butene, cis-2-butene, trans-2-butene, isobutene, 1,3-butadiene, and the like can be used.

In addition, as the alicyclic compound having 4 or less carbon atoms, at least one kind selected from cyclopropane, cyclobutane, cyclobutene, and the like can be used. Note that since these hydrocarbon-based gases are harmful to the human body, it is preferred to install a local exhaust device or the like for preventing scattering and for ensuring safety at the time of handling (in particular, at the time of mixing with a carrier gas).

(Hydrocarbon-Based Solvent)

The hydrocarbon-based solvent is liquid in normal state, and further has adequate volatility, therefore, the hydrocarbon-based solvent is not only excellent in terms of safety but can also be uniformly mixed with a carrier gas or a reaction gas. Accordingly, by using a hydrocarbon-based solvent as the organic compound capable of forming a coat film relating to the embodiment of the present invention, it becomes easy to radicalize (activate) the organic compound uniformly in the organic compound radicalization step similarly as in the above-described hydrocarbon-based gas, therefore, an extremely dense coat film can be formed evenly all over the surface of the nickel-based lithium-nickel composite oxide particle.

As such a hydrocarbon compound, an aliphatic compound, an alicyclic compound, or an aromatic compound, which has 5 or more to 8 or less carbon atoms, can be suitably used.

For example, alcohol, carboxylic acid, or the like can be used in addition to alkane, alkene, and alkyne as the aliphatic compound having 5 or more to 8 or less carbon atoms. Among them, in consideration of the ease of thermal decomposition of a coat film, alkane is preferred. Specifically, in addition to linear ones such as n-pentane, n-hexane, n-heptane, and n-octane, those having a branch such as 2-methylbutane, 2,2-dimethylpropane, 2-methylpentane, 3-methylpentane, 2,2-dimethylbutane, 2,3-dimethylbutane, 2-methylhexane, 3-methylhexane, 2-ethylpentane, 3-ethylpentane, 2,2-dimethylpentane, 2,3-dimethylpentane, 2,4-dimethylpentane, 3,3-dimethylpentane, 2-methylheptane, 2,3-dimethylhexane, and 3-ethylhexane can be suitably used.

As the alicyclic compound having 5 or more to 8 or less carbon atoms, cyclopentane, cyclohexane, cycloheptane, cyclooctane, methyl cyclopentane, cyclopentanol, cyclohexanol, cycloheptanol, cyclooctanol, methyl cyclopentane, ethyl cyclopentane, cis-1,3-dimethylcyclopentane, methyl cyclohexane, norbornane, cyclohexene, or the like can be used.

As the aromatic compound having 5 or more to 8 or less carbon atoms, benzene, toluene, xylene, ethylbenzene, or the like can be suitably used.

Among them, in consideration of the ease of handling or the thermal decomposition of a coat film, linear n-pentane, linear n-hexane, and linear n-heptane are preferred, and linear n-hexane is particularly preferred.

However, as to the hydrocarbon-based solvent, there may be a case where the volatile state cannot be maintained for a long period of time depending on the conditions at the time of mixing with a carrier gas or of the radicalization. In this case, there may be a concern that the hydrocarbon-based solvent becomes in liquid state, a deviation in the distribution of the hydrocarbon-based solvent is generated, and variation of the composition and thickness of a coat film is generated. For this reason, it is preferred to appropriately control the conditions at the time of mixing with a carrier gas or of the radicalization in the organic compound radicalization step.

[Coating Step]

The coating step is a step of coating a surface of a nickel-based lithium-nickel composite oxide particle with a coat film that contains an organic compound of a polymer or copolymer by bringing the radicalized organic compound into contact with the surface of the nickel-based lithium-nickel composite oxide particle.

In the organic compound radicalization step, the radicalized radicalized organic compound is present in various forms such as a monomer, a semi-polymer, and a polymer due to the progress of the polymerization reaction between the radicalized organic compounds. Accordingly, as to the radicalized organic compound, the following embodiments (i) to (iii) are considered:

(i) an embodiment of polymerizing the radicalized organic compounds;

(ii) an embodiment of depositing radicalized organic compounds on a nickel-based lithium-nickel composite oxide particle while polymerizing the radicalized organic compounds; and (iii) an embodiment of depositing radicalized organic compounds on a nickel-based lithium-nickel composite oxide particle after polymerizing the radicalized organic compounds.

In the method for producing a coated nickel-based lithium-nickel composite oxide particle according to the embodiment of the present invention, it is not limited to any one of the embodiments as long as the above-described coated nickel-based lithium-nickel composite oxide particle can be obtained.

In the embodiment of the present invention, the thickness of a coat film is preferably set to be in the range of 4 nm or more to 200 nm or less. When the thickness of a coat film is less than 4 nm, the permeation of moisture and carbon dioxide on a surface of the nickel-based lithium-nickel composite oxide particle cannot be sufficiently suppressed, and the positive electrode mixture slurry turns into a gel in a short period of time, therefore, this is not preferred. On the other hand, when the thickness of a coat film exceeds 200 nm, the permeation of moisture and carbon dioxide on a surface of the nickel-based lithium-nickel composite oxide particle can be suppressed, however, due to the influence of this coat film, ionic conductivity is lowered, and there may be a concern that the battery characteristics as the positive-electrode active substance are adversely affected.

In addition, in order to prevent the gelation of the positive electrode mixture slurry, and further realize the more excellent battery characteristics as the positive-electrode active substance, the lower limit value of the thickness of a coat film is set to be preferably 6 nm or more, more preferably 8 nm or more, and even more preferably 10 nm or more. Further, the upper limit value of the thickness of a coat film is set to be preferably 100 nm or less, more preferably 50 nm or less, and even more preferably 25 nm or less. This thickness can be appropriately adjusted by the condition setting of the plasma polymerization processing device to be used.

For example, in a case of using an atmospheric pressure plasma polymerization processing device (plasma polymer laboratory system PAD-1 type) manufactured by Plasmatreat Inc. as the plasma polymerization processing device, in a nozzle part, an organic compound is introduced into the generated plasma to obtain a radical organic compound, and further, by introducing a nickel-based lithium-nickel composite oxide particle from a bottom part of the nozzle part, the surface of the particle can be coated.

The control of the coat film is derived from the amount of the organic compound to be introduced and the number of introductions of the nickel-based lithium-nickel composite oxide particles.

EXAMPLES

Hereinafter, Examples of the present invention will be specifically described with Comparative Examples. However, the present invention should not be limited to the following Examples.

For Examples 1 to 6, samples each obtained by forming a coat film, which has been prepared by incorporating a mechanism for introducing particles into a bottom part of an existing nozzle part, on a surface of a nickel-based lithium-nickel composite oxide particle (15 g of the composite oxide particles having a transition metal composition represented by $Li_{1.03}Ni_{0.82}Co_{0.15}Al_{0.03}$) by using an atmospheric pressure plasma polymerization processing device (plasma polymer laboratory system PAD-1 type manufactured by Plasmatreat Inc.) were prepared. In addition, in these Examples and Comparative Examples, $N_2$ (nitrogen) was used as a carrier gas, the introduction amount of the coating material was adjusted to 20 g/hour, and further the plasmatization conditions were set as follows. Further, it is difficult to analyze the coat film on the particle surface, therefore, the coating material to be sprayed from a nozzle is deposited on a glass substrate, and it was confirmed that an organic compound having 8 or less carbon atoms is deposited on a glass substrate as a polymer obtained by ring-opening polymerization or radical polymerization by using FT-IR (Fourier transform infrared spectrophotometer) and TOF-MS (time-of-flight mass spectrometry).

Oscillation frequency of plasma generator: 21 kHz
Output voltage of generator: 280 V
Pressure: atmospheric pressure (1013.25 hPa)

The thickness of the obtained coat film of the coated nickel-based lithium-nickel composite oxide particle, and the maximum value and minimum value of the coat film were calculated by measuring the thickness of the coat film at three arbitrary points using a TEM (transmission electron microscope HF-2000, manufactured by Hitachi High-Technologies Corporation) after making the cross section of the coated nickel-based lithium-nickel composite oxide particle observable.

Example 1

Acetylene ($C_2H_2$, an aliphatic compound having 4 or less carbon atoms) was used as the organic compound. The thickness of the coat film on a surface of the nickel-based lithium-nickel composite oxide particle was 10 nm. By using the coated nickel-based lithium-nickel composite oxide as the coated nickel-based lithium-nickel composite oxide particle according to Example 1, the following stability test in air, gelation test, and battery characteristics test (such as a charge and discharge test, and a cycle test) were performed.

Example 2

Methane ($CH_4$, an aliphatic compound having 4 or less carbon atoms) was used as the organic compound. The thickness of the coat film on a surface of the nickel-based lithium-nickel composite oxide particle was 8 nm. By using the coated nickel-based lithium-nickel composite oxide as the coated nickel-based lithium-nickel composite oxide particle according to Example 2, the following stability test in air, gelation test, and battery characteristics test (such as a charge and discharge test, and a cycle test) were performed.

Example 3

Propane ($C_3H_8$, an aliphatic compound having 4 or less carbon atoms) was used as the organic compound. The thickness of the coat film on a surface of the nickel-based lithium-nickel composite oxide particle was 12 nm. By using the coated nickel-based lithium-nickel composite oxide as the coated nickel-based lithium-nickel composite oxide particle according to Example 3, the following stability test in air, gelation test, and battery characteristics test (such as a charge and discharge test, and a cycle test) were performed.

Example 4

Butane ($C_4H_{10}$, an aliphatic compound having 4 or less carbon atoms) was used as the organic compound. The thickness of the coat film on a surface of the nickel-based lithium-nickel composite oxide particle was 16 nm. By using the coated nickel-based lithium-nickel composite oxide as the coated nickel-based lithium-nickel composite oxide particle according to Example 4, the following stability test in air, gelation test, and battery characteristics test (such as a charge and discharge test, and a cycle test) were performed.

Example 5 n-hexane ($C_6H_{12}$, a hydrocarbon-based solvent of an aliphatic compound having 5 or more to 8 or less carbon atoms) was used as the organic compound. The thickness of the coat film on a surface of the nickel-based lithium-nickel composite oxide particle was 20 nm. By using the coated nickel-based lithium-nickel composite oxide as the coated nickel-based lithium-nickel composite oxide particle according to Example 5, the following stability test in air, gelation test, and battery characteristics test (such as a charge and discharge test, and a cycle test) were performed.

Example 6

Cyclooctane ($C_8H_{16}$, a hydrocarbon-based solvent of an alicyclic compound having 5 or more to 8 or less carbon atoms) was used as the organic compound. The thickness of the coat film on a surface of the nickel-based lithium-nickel composite oxide particle was 22 nm. By using the coated nickel-based lithium-nickel composite oxide as the coated nickel-based lithium-nickel composite oxide particle according to Example 6, the following stability test in air, gelation test, and battery characteristics test (such as a charge and discharge test, and a cycle test) were performed.

Comparative Example 1

A stability test in air, a gelation test, and a battery characteristics test were performed in a similar manner as in Examples 1 to 6 except that a nickel-based lithium-nickel composite oxide particle on which treatment had not been performed was used.

<Stability Test in Air>

2.0 g of the nickel-based lithium-nickel composite oxide particles according to each of Examples and Comparative Example was put into a separate glass bottle, the glass bottle was left to stand in a thermostat at a temperature of 30° C. and humidity of 70% for one week, the increased mass was measured as compared to the initial mass, and the change rate per particle mass was calculated. By setting the change rate per particle mass of the nickel-based lithium-nickel composite oxide particle after the lapse of one week according to Comparative Example 1 to 100, the change rate on every day of each of Examples 1 to 6 and Comparative Example 1 was shown in FIGS. 1 and 2.

As can be seen from FIGS. 1 and 2, the coated nickel-based lithium-nickel composite oxide particles of acetylene, methane, propane, butane, n-hexane, and cyclooctane in Examples 1 to 6, respectively had a smaller change rate per mass as compared to that of the nickel-based lithium-nickel composite oxide particle in Comparative Example 1, which had not been coated with a coat film. From this result, it was confirmed that by coating the particle with the coat film, the permeation of moisture and carbon dioxide in the air can be suppressed.

<Gelation Test>

As to the measurement of change over time of the viscosity of the positive electrode mixture slurry, a positive electrode mixture slurry (hereinafter, simply referred to as "slurry") was prepared in the following order, and then the increase of viscosity and gelation were observed.

As for the mixing ratio, a nickel-based lithium-nickel composite oxide particle according to each of Examples and Comparative Example, a conductive auxiliary, a binder, N-methyl-2-pyrrolidone (NMP) were weighed so that the mass ratio of the nickel-based lithium-nickel composite oxide particle:the conductive auxiliary:the binder:the NMP was 45:2.5:2.5:50, further 1.5% by mass of water was added, then the resultant mixture was stirred by a rotation-revolution mixer, and a slurry was obtained. The obtained slurry was stored in an incubator at 25° C., and the changes over time of the viscosity increase and the degree of gelation in Examples and Comparative Example were confirmed, respectively, by stir mixing the slurry with a spatula. The slurry was stored until obtaining complete gelation.

It took five days for the slurry according to each of Examples 1 and 2 to reach complete gelation, it took eight days for the slurry according to each of Examples 3 and 5 to reach complete gelation, and it took 14 days or more for the slurry according to each of Examples 4 and 6 to reach complete gelation. On the other hand, it took one day for the slurry according to Comparative Example 1 to reach complete gelation. From this, in the slurry according to each of Examples 1 to 6, by coating the nickel-based lithium-nickel composite oxide particle with a coat film containing an organic compound of a polymer or copolymer, the generation of impurities such as lithium hydroxide (LiOH) and lithium carbonate ($Li_2CO_3$) was suppressed, the dissolution of these impurities into the slurry was suppressed, and it was confirmed that the slurry gelation and slurry viscosity increase, which were caused by the reaction with a binder, can be prevented.

Further, in a case where the nickel-based lithium-nickel composite oxide particle was coated with a fluorine compound, the fluorine compound was generally dissolved into NMP, therefore, it is considered that even though the coated nickel-based lithium-nickel composite oxide particle was coated with the fluorine compound, the coat film is dissolved at the time of mixing with slurry. Accordingly, different from the coated nickel-based lithium-nickel composite oxide particle according to each of Examples, it is considered to be difficult to suppress the generation of impurities when the produced positive electrode is generally stored. Therefore, the reaction with an electrolytic solution accompanied by gas generation in battery driving, which is caused by the impurities generated during the storage of the positive electrode, is difficult to be suppressed, and an expensive storage facility is required.

<Battery Characteristics Evaluation>

By the following procedures, a non-aqueous electrolyte secondary battery (lithium-ion secondary battery) for evaluation was prepared, and the battery characteristics evaluation was performed.

[Production of Secondary Battery]

As for the battery characteristics evaluation of the nickel-based lithium-nickel composite oxide particle in the embodiment of the present invention, a coin type battery and a laminate type battery were prepared, and the coin type battery was subjected to a charge and discharge capacity measurement and the laminate cell type battery was subjected to a charge and discharge cycle test and a resistance measurement.

(a) Positive Electrode

Into the obtained coated nickel-based lithium-nickel composite oxide particle according to each of Examples 1 to 6 and the obtained nickel-based lithium-nickel composite oxide particle according to Comparative Example, an acetylene black as a conductive auxiliary, and polyvinylidene fluoride (PVdF) as a binder were mixed so that the mass ratio of the particle, the acetylene black, and the PVdF was 85:10:5, and the resultant mixture was dissolved into an N-methyl-2-pyrrolidone (NMP) solution to prepare a positive electrode mixture slurry. An aluminum foil was coated with the positive electrode mixture slurry by a comma coater and heated at 100° C. and dried, as a result of which a positive electrode was obtained. A load was applied to the obtained positive electrode through a roll press machine, and a positive electrode sheet in which the positive electrode density had been improved was prepared. This positive electrode sheet was punched out for the evaluation of the coin type battery so as to have the diameter of 9 mm, and also cut out for the evaluation of the laminated cell type battery so as to have the size of 50 mm×30 mm, and each of the punched-out sheet and the cut-out sheet was used as a positive electrode for evaluation.

(b) Negative Electrode

Graphite as a negative electrode active substance and polyvinylidene fluoride (PVdF) as a binder were mixed so that the mass ratio of the graphite and the PVdF was 92.5:7.5, and the resultant mixture was dissolved into an N-methyl-2-pyrrolidone (NMP) solution to obtain a negative electrode mixture paste.

In the same manner as in the positive electrode, with this negative electrode mixture slurry, a copper foil was coated by a comma coater, and heated at 120° C. and dried, as a result of which a negative electrode was obtained. A load was applied to the obtained negative electrode through a roll press machine, and a negative electrode sheet in which the electrode density had been increased was prepared. The obtained negative electrode sheet was punched out for the coin type battery so as to have the diameter of 14 mm, and also cut out for the laminated cell type battery so as to have the size of 54 mm×34 mm, and each of the punched-out sheet and the cut-out sheet was used as a negative electrode for evaluation.

(c) Coin Battery and Laminated Cell Type Battery

The prepared electrode for evaluation was dried at 120° C. for 12 hours in a vacuum dryer. By using this positive electrode, a 2032 type coin battery and a laminated cell type battery were prepared in a glove box in which the dew point was controlled at −80° C. in an argon atmosphere. For the electrolytic solution, ethylene carbonate (EC) using 1M of $LiPF_6$ as a supporting electrolyte and diethyl carbonate (DEC) (manufactured by TOMIYAMA PURE CHEMICAL INDUSTRIES, LTD.), the ratio of which was 3:7, were used, and a glass separator was used as a separator, to prepare each of the batteries for evaluation.

<Charge and Discharge Test>

The prepared coin type battery was left to stand for around 24 hours after the assembly, and charged at a current density of 0.2 C rate up to a cut-off voltage of 4.3 V in a thermostat at 25° C. after the open circuit voltage (OCV) was stabilized. After one hour of rest, a charge and discharge test for measuring the discharge capacity was performed when the battery was discharged up to a cut-off voltage of 3.0 V.

The initial discharge capacity of the coin type battery according to each of Examples was 191.88 mAh/g in Example 1, 192.01 mAh/g in Example 2, 191.79 mAh/g in Example 3, 191.85 mAh/g in Example 4, 190.98 mAh/g in Example 5, and 191.32 mAh/g in Example 6, but the initial discharge capacity of the coin type battery according to Comparative Example 1 was 191.93 mAh/g.

<Cycle Test>

In the same manner as in the coin type battery, the prepared laminate type battery was left to stand for around 24 hours after the assembly, and charged at a current density of 0.2 C rate up to a cut-off voltage of 4.1 V in a thermostat at 25° C. after the open circuit voltage was stabilized. After one hour of rest, the battery was discharged up to a cut-off voltage of 3.0 V. Next, this battery was subjected to a cycle test of repeating a cycle of 4.1 V-CC charge and 3.0 V-CC discharge at a current density of 2.0 C rate in a thermostat at 60° C., and a cycle test of confirming the capacity retention rate after 500 cycles was performed. When the first cycle was set to 100%, the capacity retention rate after the cycle test was 85.9% in Example 1, 88.0% in Example 2, 87.0% in Example 3, 86.9% in Example 4, 87.6% in Example 5, and 87.0% in Example 6, but the capacity retention rate after the cycle test according to Comparative Example 1 was 80.7%.

In the Cole-Cole plot in the impedance before the cycle test in each of FIGS. 3 and 4, the laminate batteries according to Examples and Comparative Example were approximately equal to one another. It was confirmed that the nickel-based lithium-nickel composite oxide particle used in the laminate battery in each of Examples was equivalent or superior to the nickel-based lithium-nickel composite oxide particle to which coating processing had not been performed in all of the charge and discharge capacity, the battery resistance, and the cycle characteristics due to the acetylene, methane, propane, butane, n-hexane, and cyclooctane, which became the coat film containing an organic compound of a polymer or copolymer.

From the above, it can be understood that the coated nickel-based lithium-nickel composite oxide particle according to the present invention is an excellent nickel-based lithium-nickel composite oxide particle for lithium-ion battery positive-electrode active substance, which is excellent in terms of environmental stability that has been a problem for the nickel-based lithium-nickel composite oxide particle, and further has a discharge capacity equivalent to or more than that of the high discharge capacity of the nickel-based lithium-nickel composite oxide particle.

The invention claimed is:

1. A method for producing a coated nickel-based lithium-nickel composite oxide particle, comprising:
    an organic compound radicalization step of obtaining a radicalized organic compound by introducing an organic compound having 8 or less carbon atoms into a reaction gas, which has been excited into a plasma under the atmosphere, together with a carrier gas and radicalizing the organic compound; and
    a coating step of coating a surface of a nickel-based lithium-nickel composite oxide particle with a coat film that contains an organic compound of a polymer or copolymer by bringing the radicalized organic compound into contact with the surface of the nickel-based lithium-nickel composite oxide particle.

2. The method for producing a coated nickel-based lithium-nickel composite oxide particle according to claim 1, wherein the organic compound having 8 or less carbon atoms is an organic compound including at least one or more kinds selected from the group consisting of an aliphatic compound having 4 or less carbon atoms and an alicyclic compound having 4 or less carbon atoms.

3. The method for producing a coated nickel-based lithium-nickel composite oxide particle according to claim 1, wherein the organic compound having 8 or less carbon atoms is an organic compound including at least one or more kinds selected from the group consisting of an aliphatic compound having 5 or more to 8 or less carbon atoms, an alicyclic compound having 5 or more to 8 or less carbon atoms, and an aromatic compound having 5 or more to 8 or less carbon atoms.

4. The method for producing a coated nickel-based lithium-nickel composite oxide particle according to claim 1, wherein the reaction gas includes at least one or more gases selected from the group consisting of argon, helium, nitrogen, oxygen, and air.

5. The method for producing a coated nickel-based lithium-nickel composite oxide particle according to claim 1, wherein the carrier gas includes at least one or more gases selected from the group consisting of argon, helium, and nitrogen.

6. The method for producing a coated nickel-based lithium-nickel composite oxide particle according to claim 1, wherein the nickel-based lithium-nickel composite oxide particle is represented by the following Formula (1), $$Li_xNi_{(1-y-z)}M_yN_zO_2 \qquad (1)$$

wherein x is a value of from 0.80 to 1.10, y is a value of from 0.01 to 0.20, z is a value of from 0.01 to 0.15, and 1-y-z is a value exceeding 0.65, and M represents at least one element selected from Co or Mn, and N represents at least one element selected from Al, In or Sn.

7. A coated nickel-based lithium-nickel composite oxide particle for a lithium-ion battery positive-electrode active substance, wherein a coat film of a polymer or copolymer of an aliphatic hydrocarbon compound, or a polymer or copolymer containing an alicyclic hydrocarbon compound is formed all over the surface of a nickel-based lithium-nickel composite oxide particle, so that the coat film prevents the composite oxide particle from contacting the air when the coated nickel-based lithium-nickel composite oxide particle is exposed to the air, wherein a thickness of the coat film is in a range of 4 nm or more to 200 nm or less.

* * * * *